April 4, 1944.  R. MAYNE  2,345,763
FLEXIBLE TRACK FOR SELF-LAYING TRACK VEHICLES
Filed Feb. 27, 1941
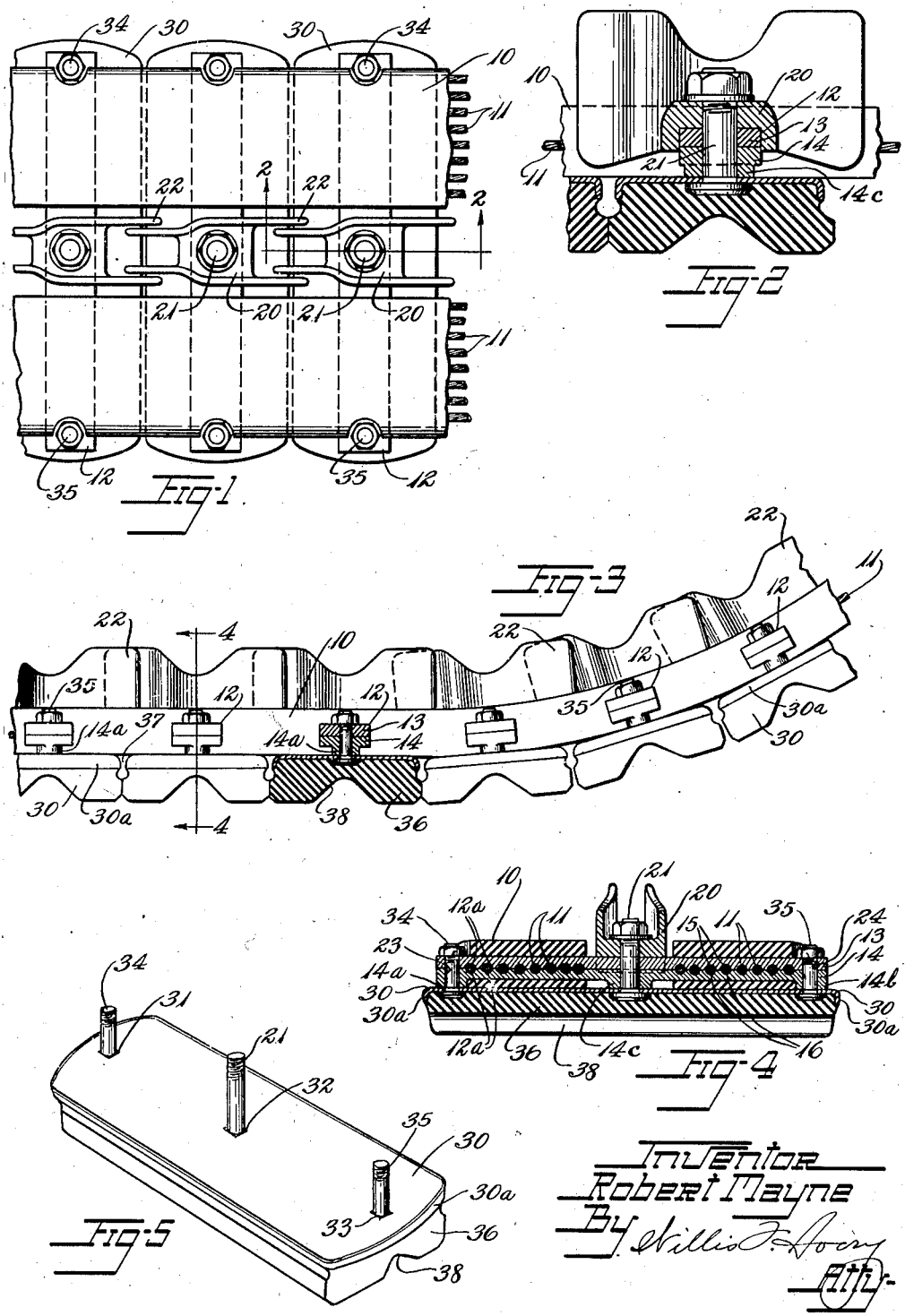

Patented Apr. 4, 1944

2,345,763

UNITED STATES PATENT OFFICE 2,345,763

FLEXIBLE TRACK FOR SELF-LAYING TRACK VEHICLES

Robert Mayne, Akron, Ohio, assignor to The B. F. Goodrich Company, New York, N. Y., a corporation of New York Application February 27, 1941, Serial No. 380,881

7 Claims. (Cl. 305—10)

This invention relates to a flexible track for use on vehicles of the self-laying track type and especially to flexible tracks having removable tread members.

In the construction of vehicles of the self-laying track type an endless track is trained about driving and guiding wheels so as to provide a substantially flat reach of the track between the guiding wheels and the ground for supporting the load of the vehicle and for transmitting the driving force to the ground.

It has been proposed to construct the track of such vehicles by enclosing a series of spaced-apart tension members or spaced apart convolutions of a single tension member, such as a flexible cable, in a body of rubber-like material providing the tread surface of the track, and to embed in said body spaced-apart driving members such as pairs of metallic cross-bars holding the tension members in spaced relation but transmitting the load thereto from the driving wheel through cushioning elements of rubber-like material separating the tension members from the driving members. While such a track has been used with some success, injury to the tread surface of the rubber body has sometimes necessitated the replacement of the entire track at considerable cost and repair of the tread surface has been difficult. Furthermore, penetration of the tread by nails or other sharp objects has permitted entrance of moisture to the tension members which has resulted in deterioration of the track.

This invention aims to overcome the forgoing difficulties and to provide an improved track construction.

The principal objects of the invention are to provide removable tread members for facilitating replacement and repair, to provide against injury to the body and to the tension members of the track, to provide security of attachment of the driving members to the tension members with cushioning of the driving connection, and to provide simplicity of construction and convenience of manufacture.

These and other objects will appear from the following description and the accompanying drawing.

Of the drawing,

Fig. 1 is a plan view of a portion of the track, constructed in accordance with and embodying the invention, looking at the wheel-engaging back thereof, parts being broken away.

Fig. 2 is a sectional detail view thereof taken along line 2—2 of Fig. 1, parts being broken away.

Fig. 3 is a side elevation thereof showing part of the track as flexed, parts being broken away and parts shown in section.

Fig. 4 is a sectional view thereof, taken along line 4—4 of Fig. 3.

Fig. 5 is a perspective view of one of the removable ground contacting shoes.

In accordance with the invention, a series of removable shoes each comprising a metallic plate and a tread of rubber-like material secured thereto are independently secured to the driving members of a track having a resilient rubber body and provide a protective layer of metal over the tread surface of the rubber body of the track while providing a substantially unbroken tread surface of rubber-like tread blocks to effect in combination with the rubber body cushioning of the vehicle and the driving connections.

Referring to the drawing, the numeral 10 designates the body of the track formed of rubber or other rubber-like material and having tension members 11 extending therethrough in spaced-apart relation in the form of reaches of flexible metallic endless cables or a continuous winding of the cable. Driving members 12 comprise metallic cross-bars 13, 14 extending across the tension members on opposite sides thereof and formed with complementary grooves 15, 16 for holding the tension members in spaced-apart relation. Each tension member has a layer 12a of cushioning material such as resilient rubber extending thereabout between the tension member and the cross-bar and acting to cushion the tension members and transmit the driving forces under shear loading of the cushion. The body of the track is divided centrally to expose the driving members for engagement with the driving sprockets, and wear pieces 20, for engaging the sprockets, are fixed thereto by bolts 21 passing through the cross-bars and holding the cross-bar members in clamped relation. Overlapping guide plates 22 are formed integrally with the wear plates and cooperate with the sprocket and guiding wheels for guiding the track.

The ends of the drive members 12 extend laterally beyond the rubber body 10 in which they are embedded, and bolt holes 23, 24 are formed therethrough to receive bolts for holding the cross-bar members clamped together and for holding the removable tread shoes, hereinafter more fully described, in place. The cross-bar members 14 have bosses 14a, 14b, around the bolt holes and extending to the lower surface of the body 10, and a similar boss 14c extends to the same level about the bolt 21.

To provide for renewal of the tread surface and to protect the flexible body 10 from injury by cuts and abrasion, a plurality of metallic shoes 30 are mounted in spaced-apart relation over its lower surface. Each shoe is apertured as at 31, 32, 33 to receive bolts 34, 21, 35 which extend through the cross-bars and act to clamp the shoes and the cross-bar members together. The shoes 30 are each provided with a tread 36 of rubber or other rubber-like material preferably secured thereto by vulcanization. The margins of the shoes 30 are preferably turned to provide a flange 30a extending downwardly along the margins of the tread to prevent spreading of the base of the tread when the tread is under compression and to provide a greater surface for bonding the metal to the rubber. The arrangement of the shoes is such that when the track is flattened the shoes are spaced from each other as at 37 whereas the rubber treads 36 preferably contact with each other at their margins, providing support of each tread from the adjoining ones and assisting to maintain the tread rubber in compression, in which condition it is best suited to resist abrasion and injury. The treads 36 may be grooved, as at 38 if desired, or in any other desired manner to provide a better grip on the earth.

In constructing the tread shoes, the bolts 21, 34, 35, are inserted through the metal shoe and the bolts are preferably squared near their heads to fit tightly in the apertures 31, 32, 33 which are correspondingly of square shape. The assembled metal parts are then preferably electroplated with a copper-zinc alloy to promote adhesion, and are then cemented with rubber cement and the rubber material for the tread is assembled thereagainst. The article is then enclosed in a mold, and heat and pressure is applied thereto to vulcanize the rubber composition and to mold it to shape.

The invention provides an integral tread shoe that can be assembled to the track by bolting it to the driving cross-bars, and when in place permits the track to flex without interfering with flexing of the cables and the rubber body thereof. In case of injury to the track, the damaged tread blocks may be quickly removed and replaced and blocks having different traction properties may be substituted where different types of ground surfaces are encountered.

Variations may be made without departing from the scope of the invention as it is defined by the following claims.

I claim:

1. A track for self-laying track vehicles, said track comprising a flexible body of rubber-like material, driving members embedded therein in spaced apart relation, each driving member extending to the face of said body at the tread side thereof and a removable shoe adapted to be seated on the surface of said body in direct engagement with one of said driving members at said face of said body at the tread side thereof and having means for detachably connecting it thereto.

2. A track for self-laying track vehicles, said track comprising a flexible body of rubber-like material having metallic driving members embedded therein in spaced-apart relation, each driving member extending beyond the sides of said body, a removable metal shoe adapted to be seated on the surface of said body and having means integrally secured thereto for detachably connecting it directly to the ends of a driving member, and a resilient tread of rubber-like material secured to said shoe by a vulcanized bond.

3. A track for self-laying track vehicles, said track comprising a flexible body of rubber-like material, flexible tension members extending therethrough, metallic cross-bars resiliently secured to said tension members in spaced-apart relation, said cross-bars being embedded in said body and exposed at the tread face thereof, removable metal shoes secured against the exposed faces of said cross-bars and secured thereto, said shoes being spaced-apart from each other, and a resilient tread block of rubber-like material secured to each shoe by a bond of vulcanization, said blocks providing a removable tread face for said track.

4. A track for self-laying track vehicles, said track comprising a flexible body of rubber-like material, flexible tension members extending therethrough, metallic cross bars resiliently secured to said tension members in spaced apart relation, said cross bars being embedded in said body and extending to the tread face thereof, removable metal shoes resiliently supported on the face of said flexible body and secured directly to said cross bars, and a resilient tread block of rubber-like material secured to each shoe by a bond of vulcanization, said blocks providing a removable tread face resiliently secured to said tension members.

5. A track for self-laying track vehicles, said track comprising a flexible body of rubber-like material, flexible tension elements extending therethrough, cross bars secured to said tension elements and disposed in spaced-apart relation, said cross bars being embedded in said body and exposed at the face thereof at the tread side, shoes comprising metal elements removably secured directly against the exposed faces of said cross bars, and cushioning tread elements secured to said metal elements of the shoes.

6. A track for self-laying track vehicles, said track comprising a flexible body of rubber-like material, flexible tension elements extending therethrough, cross bars secured to said tension elements and disposed in spaced-apart relation, said cross bars being embedded in said body and having bosses integral therewith extending through the rubber-like material at the margins of the track and centrally thereof to exposed positions at the face of said body on the tread side thereof, and shoes removably secured directly against said bosses on said face of said body at the tread side thereof.

7. A track for self-laying track vehicles, said track comprising a flexible body of rubber-like material, flexible tension elements extending therethrough, cross bars secured to said tension elements and disposed in spaced-apart relation, said cross bars each being embedded in said body and having a portion exposed to the face of said body at the tread side, shoes each seated on said face of said body and having means for connecting it with the exposed portion of a cross bar, the connecting means comprising a metallic element seated against said exposed portion of the cross bar for transmitting load through the cross bar and shoe substantially without play in the connection.

ROBERT MAYNE.